(12) United States Patent
Canders

(10) Patent No.: US 6,688,191 B2
(45) Date of Patent: Feb. 10, 2004

(54) FLY WHEEL FOR STORING ROTATIONAL ENERGY

(76) Inventor: Wolf-Rüdiger Canders, Fuchshaller Weg 38, D-37520 Osterode (DE)

(*) Notice: Subject to any disclaimer, the term of this patent is extended or adjusted under 35 U.S.C. 154(b) by 0 days.

(21) Appl. No.: 09/745,247

(22) Filed: Dec. 21, 2000

(65) Prior Publication Data

US 2001/0003900 A1 Jun. 21, 2001

(30) Foreign Application Priority Data

Dec. 21, 1999 (DE) .......................... 199 61 643

(51) Int. Cl.$^7$ ................................ F16F 15/22
(52) U.S. Cl. ...................................... 74/572
(58) Field of Search ............... 74/572, 573, 573 R, 74/574

(56) References Cited

U.S. PATENT DOCUMENTS

| | | | |
|---|---|---|---|
| 1,268,632 A | * 6/1918 | Schauffelberger | 464/101 |
| 2,737,033 A | * 3/1956 | Bendall | 464/75 |
| 3,088,332 A | * 5/1963 | ARnt, Jr. | 74/574 |
| 3,602,066 A | 8/1971 | Wetherbee | 74/572 |
| 3,837,178 A | * 9/1974 | Hackforth et al. | 464/89 |
| 3,859,868 A | * 1/1975 | Post | 74/572 |
| 4,821,599 A | 4/1989 | Medlicott | 74/572 |
| 4,991,462 A | 2/1991 | Breslich | 74/572 |
| 5,012,694 A | * 5/1991 | McGrath | 74/572 |
| 5,124,605 A | * 6/1992 | Bitterly et al. | 310/74 |
| 5,566,588 A | 10/1996 | Bakholdin et al. | 74/572 |
| 5,579,881 A | * 12/1996 | Weidinger | 192/70.25 |
| 5,760,506 A | 6/1998 | Ahlstrom et al. | 310/74 |

FOREIGN PATENT DOCUMENTS

| WO | WO 93/24765 | 12/1993 |
|---|---|---|
| WO | 9953597 | 10/1999 |

OTHER PUBLICATIONS

Dissertation by Christoph Wrede "Flywheel mass energy store having integrated functional elements", Dissertation TU–BS, 1998: cover page and abstract.
R. Gasch and H. Pfützner, "Gyrostatics," *Rotordynamik* (*Rotor Dynamics*), (Springer–Verlag: Berlin, Heidelberg, New York, 1975), 90–107.
German publication: Wissenschanftlich–Technisches Zentrum, "Information zur Schwungrad–Entwicklung in der WTZ Roβlau gGmbH," *WTZ Rosslau GmbH* (Feb. 1998).
Patent Abstracts of Japan, Publication No. JP 10252832 A.

* cited by examiner

*Primary Examiner*—Chong H. Kim
(74) *Attorney, Agent, or Firm*—Husch & Eppenberger, LLC; Robert E. Muir; Robert C. Haldiman

(57) ABSTRACT

An improved fly wheel for storing rotational energy includes an inner ring and an inertial ring separated by an intermediate space. A radially resilient coupling device connects the inner and inertial rings and is subjected to a radial bias force, which exerts an outward force on the inertial ring.

16 Claims, 3 Drawing Sheets

FLY WHEEL FOR STORING ROTATIONAL ENERGY

FIELD OF THE INVENTION

The invention relates generally to motor or generator components and, more particularly, to an improved flywheel arrangement for storing rotational energy.

BACKGROUND OF THE INVENTION

Modern flywheels are preferably made from composite fiber materials and can be driven up to extremely high peripheral speeds, e.g. 800 to 1000 meters per second. Appropriate high-speed electrical machines, which may operate as motors and/or generators, are used for coupling-in and coupling-out the stored rotational energy.

The stress induced radial displacements in typical modern flywheels are considerable and are much larger than the permitted radial displacements of the rotor yoke in the electrical machine connected to the flywheel. Thus, the permissible peripheral speed of the inertial ring is always substantially greater than that of a machine rotor using a conventional stack of laminations. If one takes into account that the high stability of the composite fiber material can only be utilized with rings having a radius ratio of inner radius $R_i$ to outer radius $R_o$ wherein $R_i/R_o$ is greater than 0.7, then this leads to compatibility problems. Three primary flywheel designs have been used in the past to address these problems.

In the first design, the peripheral speed is limited by directly winding the rotor of an external rotor type motor so that the residual displacements of the machine rotor, which is supported to a certain extent by the pre-tensioned fiber structure, will always remain below the yield point of the rotor laminations. This design results in long, cylindrical inertial bodies having a moment of inertia $J_T$ about the transverse axis of the cylinder, which is larger than the moment of inertia about the rotational axis $J_R$ of the cylinder. Because of the need for appropriately stiff mountings, this design is an unfavourable implementation from the point of view of rotor dynamics. See, Gyrostatics, breaking through the second critical rotational speed, c.f. Gasch/Pfützner, Rotor Dynamics, Published by Springer.

In a second design, the inertial ring is separated from the electrical machine, whereby the radial displacements of the inertial ring, which now has a correspondingly larger diameter, can be considerably greater then those of the machine rotor. This can be implemented in motors using external or internal rotors since a radially elastic spoke structure is now connected merely to the rotating part of the electrical machine thereby bridging over the differences in the radial displacements. The polar moment of inertia JR in this arrangement is thereby greater than the axial moment of inertia JT, so that passing the second bending-critical rotational speed is no longer necessary. The radial elasticity of the spoke structure is frequently achieved by means of flexible spoke structures, such as those described in the U.S. Pat. No. 5,760,506 or in the dissertation by C. Wrede "Flywheel mass energy store having integrated functional elements", Dissertation TU-BS, 1998. The disadvantages inherent in such structures are the considerable axial dimensions of the electrical machine which are required at high powers because of the limited peripheral speed of the drive motor, and the necessary stiffness of the radial flexible spokes in the peripheral direction, which is required for conveying the high torque levels. Such curved spokes are generally no longer sufficiently stiff at high rotational speeds.

In the third design, the inertial body of the flywheel is arranged in a relatively thin bell-shaped shell and forms a section of a rotational ellipsoid. The shaft of a conventional electrical machine is coupled to the vertex of the ellipsoid. See, The composite fiber fly wheel as an energy store, Company publication, "WTZ Rosslau GmbH", Postfach 240, 06855 Rosslau. The resilient expansions are accommodated here by the bending moments of the shell structure of the inertial ring. Although this arrangement can achieve very high specific energy densities, the absolute amount of energy that can be stored and the transferable torque are comparatively small, or it leads to dimensions for the inertial ring that are technologically not controllable as well as to problems in transferring the forces from the inertial body to the shaft.

SUMMARY OF THE INVENTION

It is an aspect of the invention to overcome one or more of the deficiencies described above.

Another aspect of the invention is to provide an arrangement in a flywheel that enables larger amounts of rotational energy to be stored as well as larger levels of torque and power to be conveyed.

In accordance with one aspect of the invention, there is provided a flywheel arrangement having an inner ring and an inertial ring that are separated by an intermediate space. This arrangement allows the tangential tensile strength of the inertial ring to be fully utilized, thereby permitting higher peripheral speeds. In addition, the separation of the inner and inertial rings increases the moment of inertia and, consequently, the stored rotational energy for a given peripheral speed. The arrangement also allows the use of inertial rings having a smaller relative thickness. A coupling device links the inner and inertial rings. Advantageously, the coupling device is radially elastic and is subjected to a radial bias force.

In another embodiment, the coupling device is formed by spring rings made of a composite fiber material.

In another embodiment, the inner ring is formed by a rotor attached to the machine, a mounting ring arranged to accept the coupling device, and a support ring made of a highly stable material.

In another embodiment, the inner and inertial rings are connected with the coupling device by an interlocking relationship.

Other aspects, features and advantages of the present invention will become apparent from the following detailed description when taken in conjunction with the accompanying drawings. The above listed aspects, features and advantages should not be construed as all-inclusive.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1A:
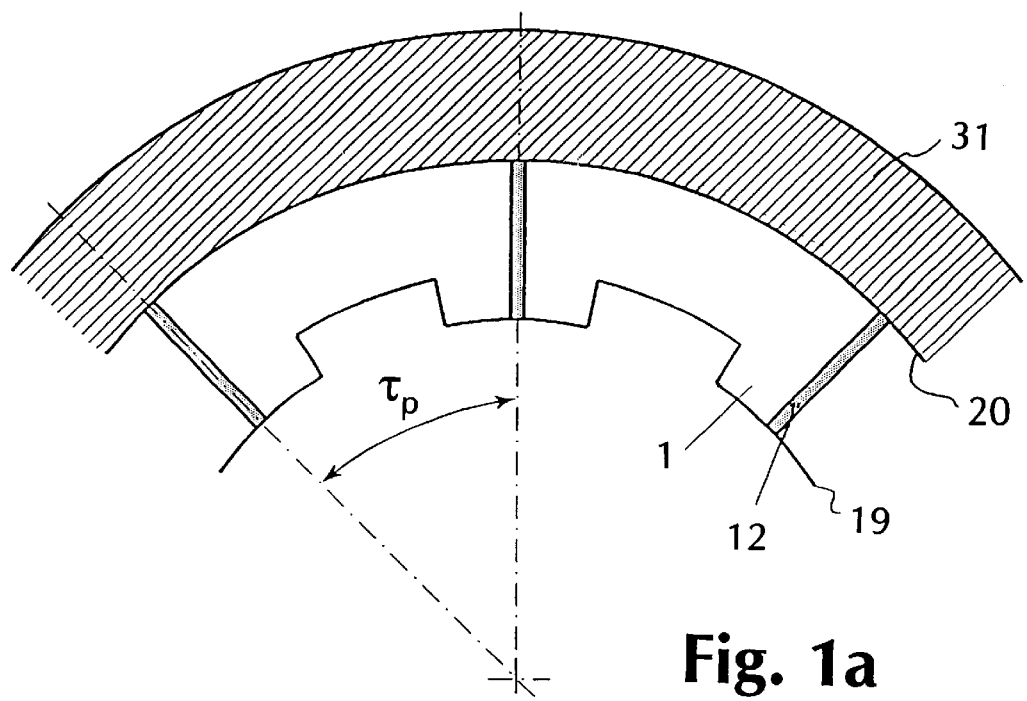
FIG. 1a is a radial section through an inner ring in accordance with a first embodiment of the invention.
Figure 1B:
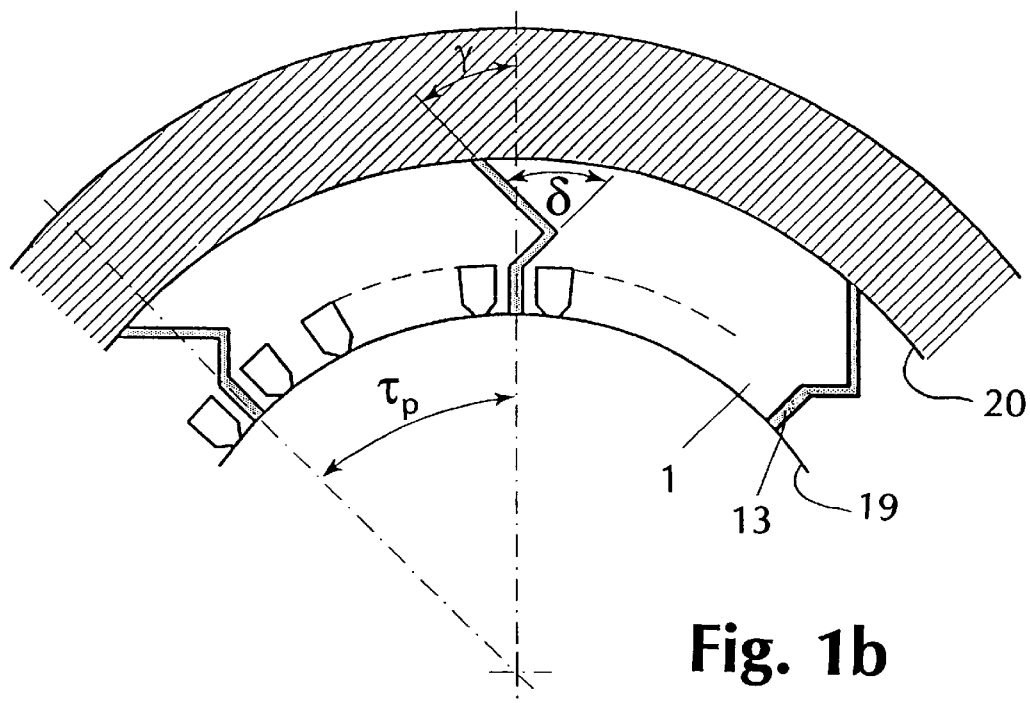
FIG. 1b is a radial section through an inner ring in accordance with a second embodiment of the invention.

As shown in FIGS. 1a, 1b, there is provided a rotor 1 which is divided into several sections by parting lines 12, 13. The parting lines 12, 13 thereby extend from a radially inner edge 19 to a radially outer edge 20. The rotor 1 may serve as the rotor yoke in an electrical machine using external rotors. Each of the sections produced by the parting lines 12, 13 advantageously corresponds to a pole-pitch. In the case of synchronous energy converters, for example, synchronous machines, reluctance machines and permanent magnet excited machines, it is thereby expedient to set this angle δ to zero in the case of a division of the rotor at the center of the pole. In the case of asynchronous machines, the angle δ of intersection can be set such that the magnetic susceptance of the corresponding air gap is appropriately large compared to the main air gap of the machine. The parting lines may extend directly radially outwards, as shown in FIG. 1a, or they may extend outwardly in the form of a zigzag as shown in FIG. 1b. Advantageously, a resilient intermediate layer may be inserted into the parting lines 12, 13 in order to pretension the rotor.

Figure 2:
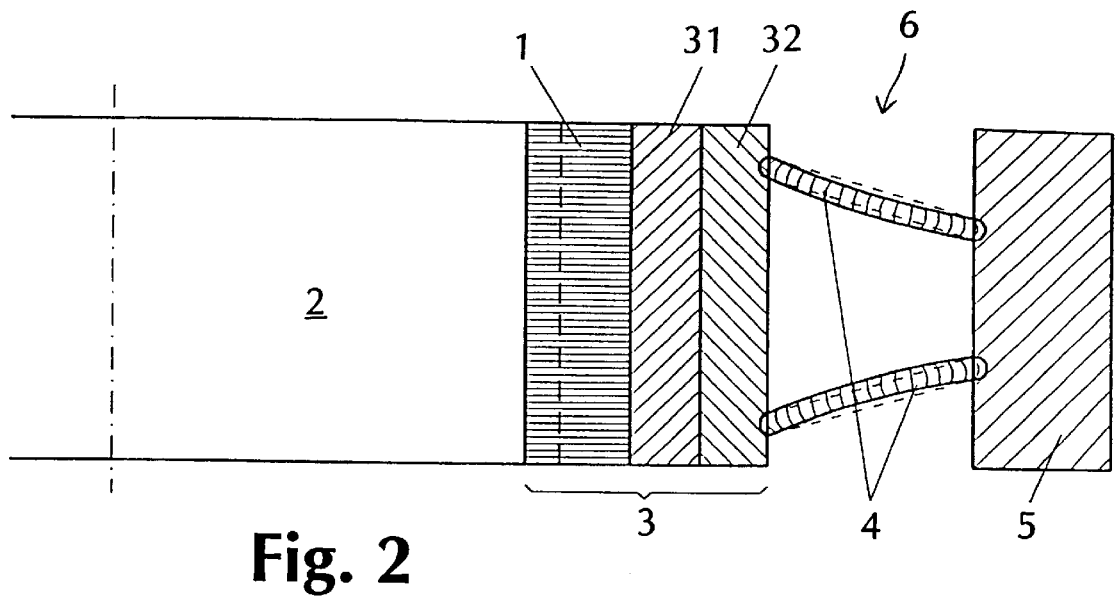
FIG. 2 is an axial section through a flywheel in accordance with one embodiment of the invention.

FIG. 2 shows a support ring 31 of highly stable fiber material (high tenacity fibers, HT fibers) that is formed on the rotor 1 for accommodating the radial loads on the subdivided rotor yoke 1 caused by centrifugal force. A mounting ring 32 of fiber material having a high modulus of elasticity (high modulus fibers, HM fibers) is applied to the support ring 31 for limiting the peripheral expansions. This allows the radial loads caused by centrifugal force to be accommodated while peripheral expansion is limited. The parting lines 12, 13 thereby only open up by a few tenths of a millimeter under the effects of centrifugal force and thus, as additional, variable air gaps, do not substantially affect the operational behaviour of the drive motor. In this embodiment, the inner ring 3 serves as a rotor or compound rotor in which the rotor 1 or the rotor yoke 1 forms part of the electrical machine 2.

Figure 3:
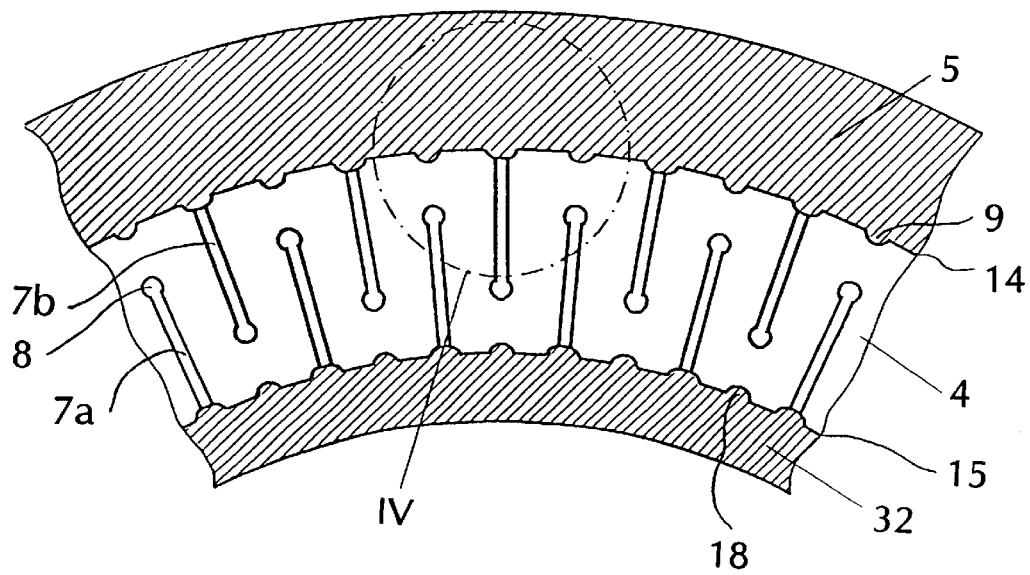
FIG. 3 is a radial section through a radial outer region of the fly wheel of FIG. 2.
Figure 4:
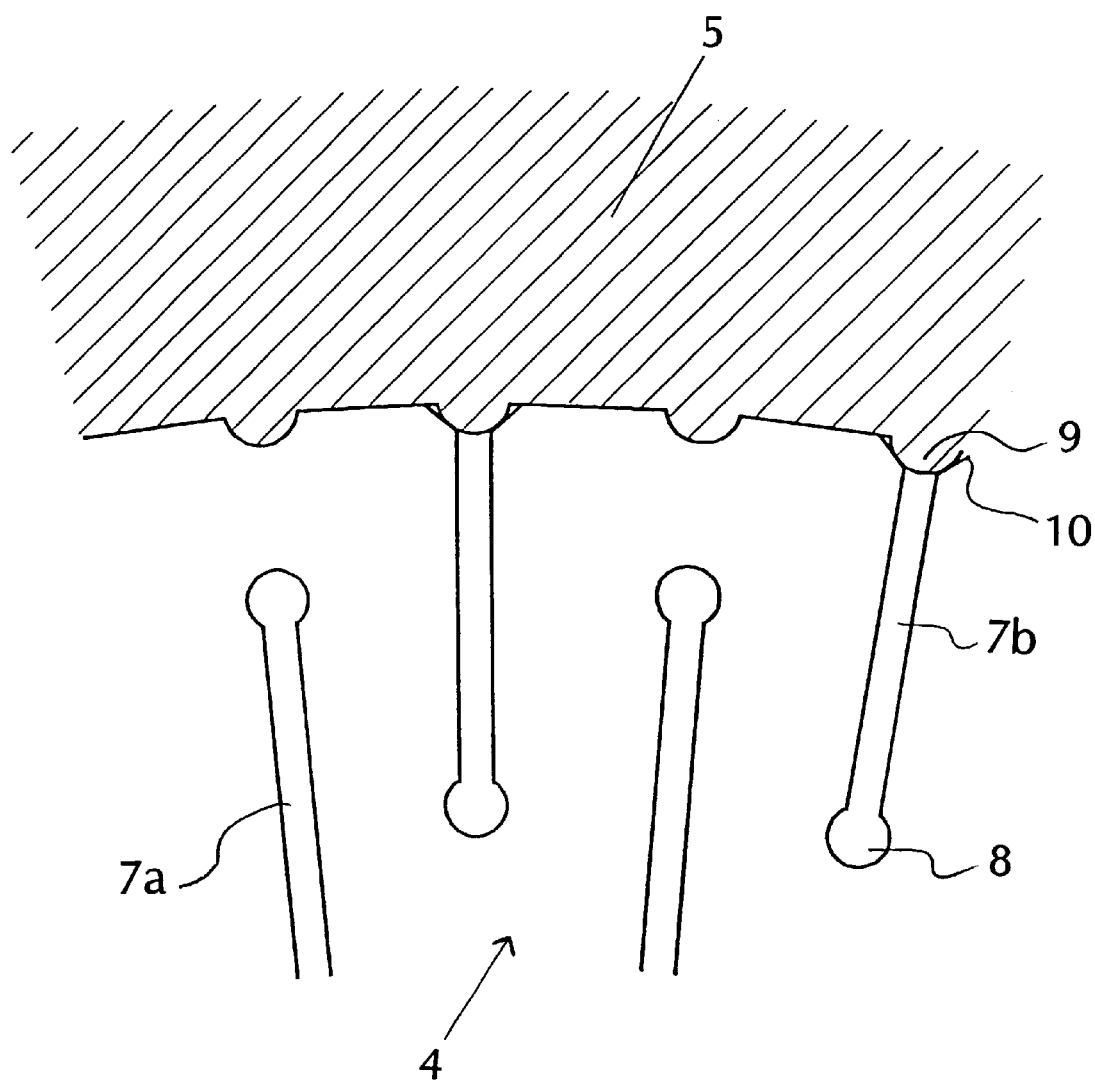
FIG. 4 is closer view of area IV in FIG. 3.

An inertial ring 5, shown in FIGS. 2, 3 and 4, has an inner diameter which is larger than the outer diameter of the inner ring or compound rotor 3. A radially intermediate space 6 is thus formed, wherein a coupling device for coupling the inertial ring 5 to the inner ring 3 is located. The coupling device 4 is thereby subjected to a radial bias force. It may be formed for example, as shown in FIG. 2, by two disk springs or spring rings made of a compound fiber material since these have a sufficiently high stiffness for conveying torque in the peripheral direction. These spring rings or disk springs may have a lower modulus of elasticity then the modulus of elasticity of the support ring 31 and the mounting ring 32, and they may, for example, consist of a glass fiber reinforced synthetic material or an aramid fiber reinforced synthetic material. When the radial bias force is sufficiently high, the ring springs develop a dome shape in the axial direction as shown in FIG. 2. The ring springs 4 are arranged in opposite directions, on the envelopes of a cone, so that they can withstand greater bias forces in the axial direction due to their dome shape. In addition, the forces exerted in the axial direction will be compensated by their oppositely directed alignment, so that the inertial ring 5 will be firmly fixed to the inner ring 3 and will not experience axial forces. In one embodiment, the ring springs 4 are accommodated in peripheral grooves in the mounting ring 32 and the inertial ring 5.

The spring ring 5 may be designed in dependence on the storage requirements, especially the requirements in respect of power, rotational speed and the amount of energy to be stored. Hereby, a fiber material having a high modulus of elasticity or of high tenacity can be used. While it is rotating, the inertial ring 5 expands substantially due to the elevated peripheral speeds, whereby the radially intermediate space 6 will become enlarged. The radially pretensioned disk springs 4 will thereby relax, at least partially, and thereby adopt the contour shown by the dotted lines in FIG. 2. The axial dome shape is completely or substantially reduced, especially at high operational speeds, so that the disk springs 4 will be completely or to a large extent free of tension. A sufficiently stiff construction is thereby be achieved which will thus ensure the radial centralization of the inertial ring as well as the transfer of large amounts of torque between the inertial ring 5 and the inner ring 3 at all rotational speeds.

Due to the provision of a support ring 31 and an additional mounting ring 32, the properties of the rotor 1, which is generally in the form of a stack of laminations and has a relatively large degree of flexibility in the peripheral direction, are combined with the further fiber properties of the support ring 31 and the mounting ring 32. Furthermore the construction of the disk springs 4 may be matched to the demands imposed, and especially to the construction and the properties of the inertial ring 5. By correspondingly matching the material properties, especially the stability and moduli of elasticity of the inertial ring 5, the mounting ring 32, the support ring 31 and the disk springs 4, the differential displacement between the inertial ring 5 and the inner ring 3 will be balanced-out to a large extent. Force is directed via the disk springs 4 over virtually the whole of the periphery so that the loads on the joints will be comparatively small. In alternate embodiments, the disk springs 4 are connected to the inertial ring 5 and the inner ring 3, namely the mounting ring 32, in interlocking, frictional or material manner.

As can be seen especially in FIG. 3, an interlocking arrangement is obtained if protrusions 9, 18 and corresponding notches is are formed in the mounting ring 32 and/or the inertial ring 5, into which, corresponding notches or protrusions in the ring springs 4 or disk springs engage. High resilience of the ring springs 4 in the axial and tangential direction is advantageously achieved if the ring springs 4 are slotted radially. In one particular embodiment shown in FIG. 3, they have alternately arranged slots 7a extend from their inner edge 15 and radial slots 7b extend from their outer edge 14. The end of the slots are limited by roundings 8 so as to prevent the formation of cracks. As is shown in the embodiments of FIG. 3 and FIG. 4, the slots 7a, 7b accommodate the elevations 9, 18 in the conical ends 10 of the slots 7a, 7b.

This arrangement provides many advantages. Separation of the inner and inertial rings allows the tangential tensile strength of the inertial ring to be fully utilized so that higher peripheral speeds may be obtained. In addition, the moment of inertia and, consequently, the stored rotational energy are increased for a given peripheral speed. The arrangement also allows the use of inertial rings having a smaller relative thickness, which addresses the problem of rings with greater thickness having lower radial tensile strength or being subject to self stresses.

Because the coupling device is resilient and subject to a radial bias force, it is possible to achieve secure coupling between the inertial ring and the inner ring even at higher peripheral speeds or high revolutions. The coupling device provides elasticity and can thereby attain a partially unstressed state at the desired operational speeds, whereby good transfer of the torque can be ensured, especially at high powers. The use of a coupling device which is domed or bowed due to the resilient bias force when the machine is at a standstill, whereby this dome shape or bowed shape will be correspondingly reduced at high rotational speeds, ensures proper resilient compliance without adversely affecting the stiffness of the coupling device.

While preferred embodiments of the present invention have been illustrated and described, this has been by way of illustration and the invention should not be limited except as required by the scope of the appended claims.

We claim:

1. A flywheel for storing rotational energy in a machine, including:

an inner ring operatively connected to the machine and formed by a rotor having an outside diameter;

an inertial ring located radially outward from the rotor and the inertial ring having an inside diameter larger than the outside diameter of the rotor, thereby creating an intermediate space between the rotor and the inertial ring; and a coupling device located in the intermediate space between the rotor and inertial ring for conveying torque between the rotor and the inertial ring, the coupling device being radially elastic and subjecting the inertial ring to a radial bias force, wherein the radial bias force is a force of pressure directed radially outwardly to the inertial ring, the coupling device comprising a spring ring which is compressed between the rotor and the inertial ring, whereby the radial bias force creates a doming of the spring ring, and the doming of the spring ring decreases and is substantially eliminated as a rotational speed of the machine increases to an operational speed.

2. The flywheel as set forth in claim 1, wherein the rotor includes a support ring and a mounting ring which accommodates the coupling device and is located radially outward from the rotor.

3. The flywheel as set forth in claim 2, wherein the support ring is located between the rotor and the mounting ring.

4. The flywheel as set forth in claim 3, wherein the mounting ring and the support ring include composite fiber material.

5. The flywheel as set forth in claim 4, wherein the composite fiber material includes a carbon fiber reinforced synthetic material.

6. The flywheel as set forth in claim 3, wherein the mounting ring and the support ring include composite fiber material layers wound in a peripheral direction.

7. The flywheel as set forth in claim 3, wherein the mounting ring has a higher modulus of elasticity than the support ring.

8. The flywheel as set forth in claim 1, wherein the coupling device is interlockingly connected to both the rotor and the inertial ring.

9. The flywheel as set forth in claim 1, wherein the coupling device is operatively connected to both the rotor and the inertial ring.

10. A flywheel for storing rotational energy in a machine, including:

an inner ring operatively connected to the machine and having an outside diameter;

an inertial ring located radially outward from the inner ring and the inertial ring having an inside diameter larger than the outside diameter of the inner ring, thereby creating an intermediate space between the inner ring and the inertial ring; and a coupling device located in the intermediate space between the inner ring and inertial ring for conveying torque between the inner ring and the inertial ring, the coupling device being radially elastic and subjecting the inertial ring to a radial bias force, wherein the radial bias force is a force of pressure directed radially outwardly to the inertial ring, the coupling device being composed of a spring ring which is compressed between the inner ring and the inertial ring, wherein the spring ring contains a plurality of radial slots.

11. The flywheel as set forth in claim 10, wherein the radial slots alternate between extending radially inwards from an outer edge of the spring ring and extending radially outwards from an inner edge of the spring ring.

12. The flywheel as set forth in claim 10, wherein the outer surface of the inner ring and the inner surface of the inertial ring include elevations which correspond to the slots in the spring ring.

13. The flywheel as set forth in claim 1, wherein the spring ring is composed of at least two disk springs which are oppositely inclined in the axial direction of the rotor and extend along envelopes of shells wherein the axes of the shells coincide with a rotational axis of the machine.

14. A method for utilizing a flywheel for storing rotational energy in a machine, including:

connecting an inner ring to the machine;

locating an inertial ring radially outwardly from the inner ring and with an inside diameter larger than the outside diameter of the inner ring thereby creating an intermediate space between the inner ring and the inertial ring;

transferring torque between the inner ring and the inertial ring with a coupling device located in the intermediate space between the inner ring and inertial ring; subjecting the inertial ring to a radial bias force directed radially outward to the inertial ring as a force of pressure to expand the inertial ring; and rotating the rings and substantially eliminating the radial bias force directed radially outward to the inertial ring as a rotational speed of the machine increases to an operational speed.

15. The flywheel as set forth in claim 1, wherein the inertial ring is expandable.

16. The flywheel as set forth in claim 15, wherein the coupling device is constructed and arranged to allow the inertial ring to expand at an elevated peripheral speed.

* * * * *

UNITED STATES PATENT AND TRADEMARK OFFICE
CERTIFICATE OF CORRECTION

PATENT NO. : 6,688,191 B2
DATED : February 10, 2004
INVENTOR(S) : Canders

It is certified that error appears in the above-identified patent and that said Letters Patent is hereby corrected as shown below:

<u>Column 4,</u>
Line 38, please remove the word "is" between "notches" and "are"

Signed and Sealed this

Seventeenth Day of August, 2004

JON W. DUDAS
*Acting Director of the United States Patent and Trademark Office*